United States Patent [19]
Savovic et al.

[11] Patent Number: 5,169,733
[45] Date of Patent: Dec. 8, 1992

[54] SHOCK ABSORBING BATTERY CELL INTERCONNECT

[75] Inventors: Niko M. Savovic, Sunrise; Adnan Aksoy, Boca Raton, both of Fla.

[73] Assignee: Motorola, Inc., Schaumburg, Ill.

[21] Appl. No.: 726,499

[22] Filed: Jul. 8, 1991

[51] Int. Cl.⁵ .............................................. H01M 2/22
[52] U.S. Cl. ................................... 429/157; 429/159
[58] Field of Search ................ 429/65, 99, 157, 159

[56] References Cited

U.S. PATENT DOCUMENTS

| | | | |
|---|---|---|---|
| 1,161,668 | 11/1915 | Heinrich et al. | 429/151 |
| 4,070,821 | 11/1978 | Sumogyi | 429/99 X |
| 4,576,880 | 3/1986 | Verdier et al. | 429/157 X |
| 4,871,628 | 10/1984 | Parker | 429/99 X |
| 5,024,605 | 6/1991 | Katasani et al. | 429/99 X |

Primary Examiner—Stephen Kalafut
Attorney, Agent, or Firm—Pablo Meles

[57] ABSTRACT

A shock absorbing battery pack (5) comprises a battery housing (15) having a plurality of cells within the housing. The cells each have a negative cell terminal (24) coupled to a can (20) and a positive cell terminal (22). Between the cell terminal resides a spring means (12) for providing shock absorption.

6 Claims, 3 Drawing Sheets

SHOCK ABSORBING BATTERY CELL INTERCONNECT

TECHNICAL FIELD

This invention relates to batteries, and more particularly to a shock absorbing cell interconnect within a battery pack.

BACKGROUND OF THE INVENTION

Battery packs for portable electronic products are typically subject to repeated number of drops. In particular, users of portable communication products such as two-way radios, cordless telephones, and cellular phones tend to drop their portable products, causing the problem of intercell contact intermittency. This temporary loss of power due to a broken connection causes unpredictable device operation, or in the case of a device with volatile memory circuits, a total loss of the memory's contents. This problem could potentially cause the loss of communications and/or other functions in other portable electronic products as well.

A battery can comprise of a single battery cell or a plurality of battery cells arranged in a stick fashion, or end-to-end, for example. A contacting scheme is required to reliably connect the battery cells between themselves and with the external electronic circuitry in the electronic device during all modes of operation. Battery cells are often cylindrically or rectangularly shaped and include positive and negative electrical contact surfaces at their opposed ends respectively. Consequently, the battery cells are coupled together to form batteries generally located in a cylindrical chamber or a rectangular chamber formed within a battery housing. To contact a battery, present embodiments require that conductive contacts be placed at opposite ends of the cylindrical or rectangular chamber so as to electrically and mechanically contact the respective positive and negative battery terminal surfaces of the battery situated in the chamber. Using conventional spring contacting methods, a conductive spring that compresses when the battery is inserted is situated at one end of the chamber. The spring force exerted by the contact acts to retain the battery against an opposing contact which is typically located on the opposite end of the battery.

For the production of battery packs where the cells are placed end-to-end, intercell connections such as welds are often used between cells to prevent the plurality of battery cells from being permanently dislocated or displaced due to a vibration or a drop of the electronic device. The intercell connections are necessary since typically the contact spring force of the spring contact at the end of the cell string is not high enough to overcome the high frictional forces required to eliminate the internal rattle of the cells during vibration or a drop.

The need to eliminate the problem of intercell contact intermittency is even greater today, since the trend in manufacturing of battery packs is toward a weldless battery design. In addition, manufacturing cycle time would be reduced with the eliminated step to spot weld battery cells together in a battery pack since welding is an inefficient manufacturing step. However, intercell contacts still continue to be welded due to the unreliability of weldless batteries. Thus, the trend towards weldless battery packs will move forward as the risk of intercell contact intermittency diminishes. Therefore, a need exists for a battery pack, particularly a weldless battery, that will endure repeated drop conditions and eliminate the problem of intercell contact intermittency.

SUMMARY OF THE INVENTION

A shock absorbing battery pack comprises a battery housing having a plurality of cells within the housing. The cells each have a negative cell terminal coupled to a can and a positive cell terminal. Between the cell terminal resides a spring means for providing shock absorption.

DESCRIPTION OF THE PREFERRED EMBODIMENT

Figure 1:
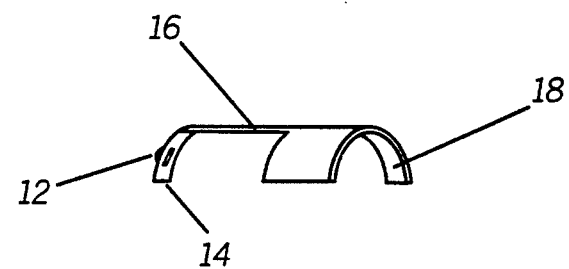
FIG. 1 is a perspective view of a battery cell clip-on spring in accordance with the present invention.
Figure 2:
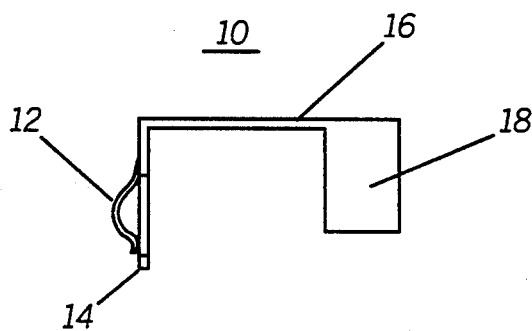
FIG. 2 is a side view of the battery cell clip-on spring of FIG. 1.
Figure 3:
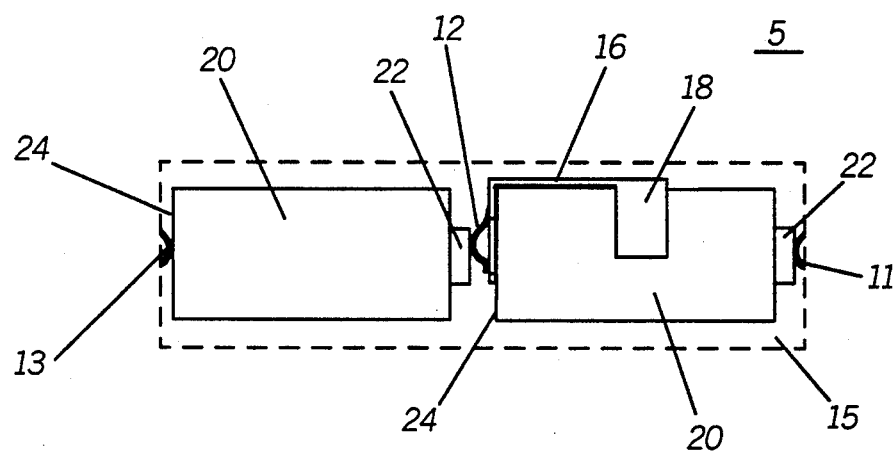
FIG. 3 is a side view of the clip-on spring on a cell in accordance with the present invention.

Referring to FIGS. 1 and 2 there is shown a perspective view and a side view respectively of a clip-on spring 10 having preferably a semi-circular first portion 18 for clasping on or clipping on to a cylindrical cell. Of course, the shape of portion 18 can be U shaped or any other shape required to clasp onto a different shaped cell such as a parallelpiped shaped cell. The clip-on spring, preferably made of a conductive metal such as copper or nickel, comprises further a vertical member 14 and a connecting member 16 substantially oriented perpendicular to the vertical member. Integrally cut from the vertical member 14 is a spring member 12. Preferably, portion 18, and members 16, 14, and 12 are all integrally formed from one metal piece. Referring to FIG. 3, the shock absorbing battery pack 5 and the clip-on spring 10 of FIGS. 1 and 2 is shown snapped on to a first cell 20 having a positive terminal 22 and a negative terminal 24. The two cells shown, forming a battery, are within a housing 15 having a negative terminal spring 13 and a positive terminal contact 11 as is known in the art. When the battery is subjected to a drop or vibration, the spring 13 biases the positive terminal 22 of a second cell into the negative terminal 24 of the first cell. Unfortunately, the force of the spring 13 is usually not sufficient to retain the intercell connection between the two cells from breaking unless they were welded. In a weldless battery, such as the one shown in FIG. 3, the use of the clip-on spring 10 would reduce the liklihood of having intermittent intercell connections since the spring 12 biases the cell in the opposing direction that the spring 13 biases the cell. Thus, a shock absorbing intercell connection is achieved.

Figure 4:
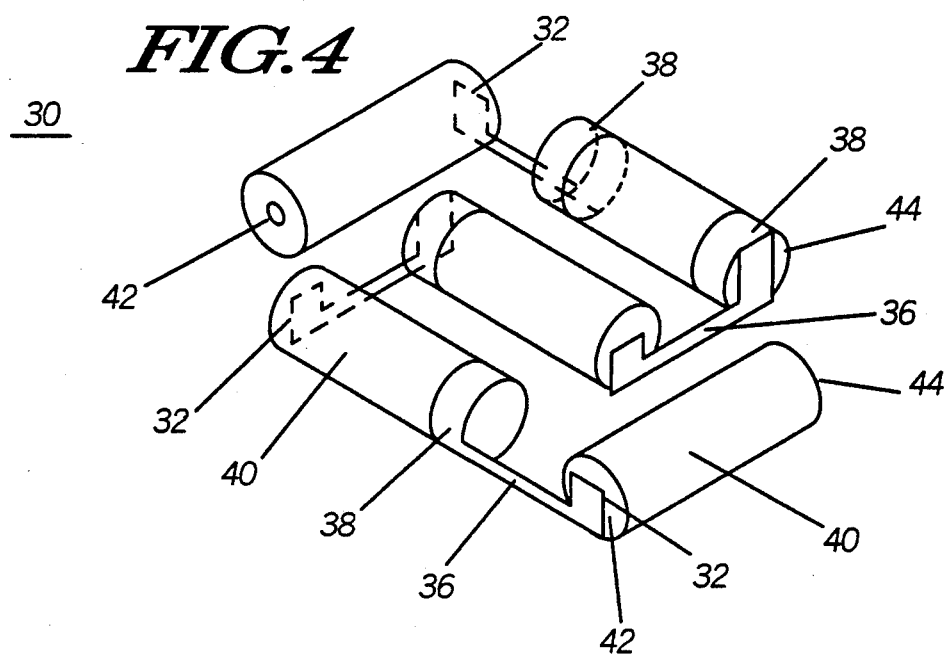
FIG. 4 is perspective view of a 5 cell battery arrangement using clip-on springs in accordance with the present invention.

Referring to FIG. 4, there is shown an alternative embodiment of the present invention using a different cell arrangement 30 than the typical stick fashion. Cell arrangement 30 comprises 5 cells, each cell having a can 40 electrically coupled to the negative cell terminal 44 and an isolated positive terminal 42. The clip-on spring providing the intercell connections comprise of a semi-circular member 38 for clamping onto a cylindrical cell, a connecting member 36 and a spring 32. Again, other shapes for the semi-circular member could be used with the present invention. For example, member 38 could be a slip-on ring. Preferably, the connecting member will be bias in the same direction as the spring 32 to provide a greater intercell contact force. The cell arrangement 30 would preferably be inside a substantially rectangular housing (not shown). Typically the space between the cans of the cells would be taken up by foam or hot melt (not shown) to prevent shorts and to retard the movement of the cells.

Figure 5:
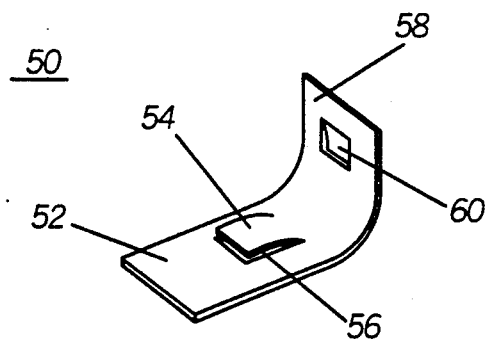
FIG. 5 is a perspective view of another cell spring in accordance with the present invention.
Figure 6:
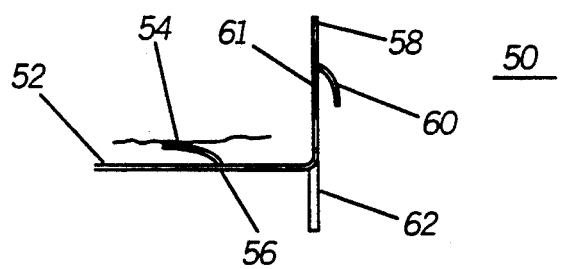
FIG. 6 is a side view of the cell spring of FIG. 5.
Figure 7:
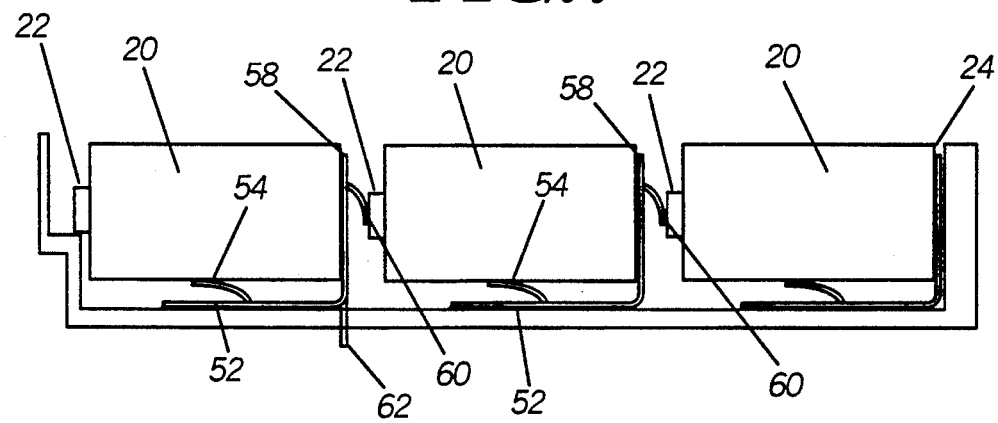
FIG. 7 is a side view of the cell spring of FIGS. 5 and 6 on a battery in accordance with the present invention.

Referring to FIGS. 5, 6, and 7, there is shown another embodiment of the present invention. The spring clip 50 preferably comprises an integrally formed metal member having a horizontal portion 52, a vertical member 58, a spring 54 for contacting the can 20 of a cell, and a spring 60 for coupling and biasing the negative terminal of a cell towards the positive terminal of an adjacent cell. The springs 54 and 60 are essentially cut out tabs from the spring clip 50 forming cavities 56 and 61 respectively. Additionally, spring clip 50 includes a post 62 for entrenching the spring clip 50 into a housing (not shown).

Figure 8:
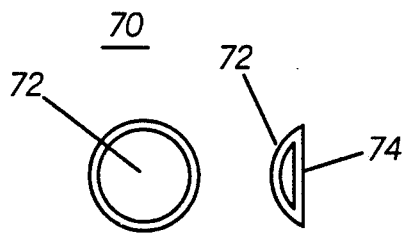
FIG. 8 is a top plan view and side view of a popple switch.
Figure 9:
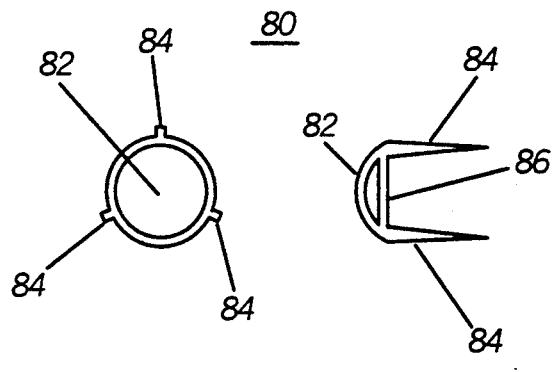
FIG. 9 is a top plan view and side view of a popple view in accordance with the present invention.
Figure 10:
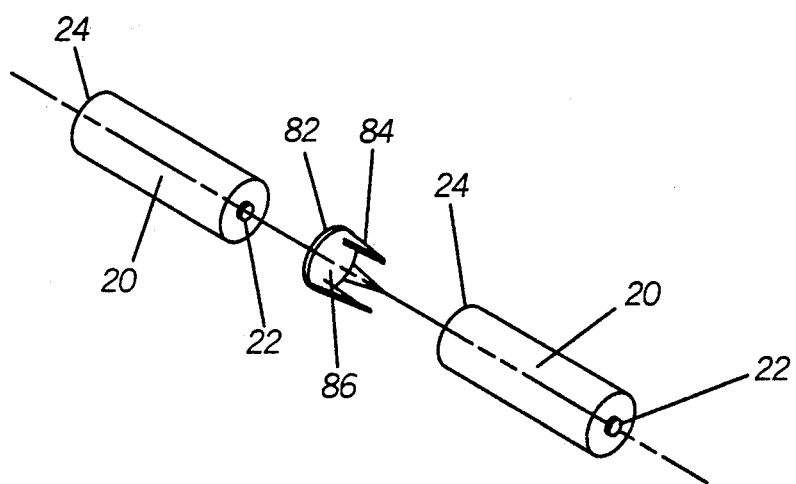
FIG. 10 is an exploded peripheral view of a popple switch and battery cell.
Figure 11:
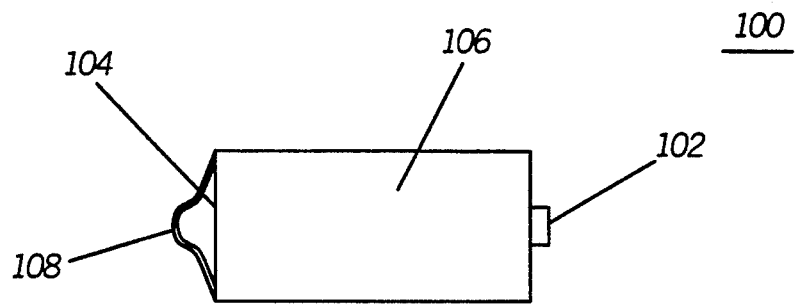
FIG. 11 is a side view of a battery cell having a builtin spring in accordance with the present invention.

Referring to FIG. 8 there is shown a top view and a side cut view of a popple contact 70. The popple contact 70 comprises a dome 72 and a flat member 74. The flat member 74 of the popple contact 70 is preferably coupled to the typically flat negative terminal (24) of a cell. The dome 72 biases the negative terminal towards the adjacent cell's positive terminal. Alternatively, a double domed poppled contact (not shown) could be used as well. Referring to FIGS. 9 and 10, another popple contact 80 comprises a dome 82, a flat member 86, and conductive legs 84. The legs 84 would provide some contact with the can 20 of a cell and further provide a means for the popple contact 80 to be retained against the negative terminal 24 of the cell. As with the previous embodiment using springs, the popple contact would bias the negative terminal 24 of one cell towards the positive terminal 22 of an adjacent cell within a housing (not shown). In an alternative embodiment of the present invention shown in FIG. 11, the spring would preferably be "built in" as part of the battery cell. The cell 100 comprises a positive terminal 102, and a can 106 coupled to a negative terminal 104 and further coupled to a built-in spring 108. The

We claim as our invention:

1. A shock absorbing battery pack, comprising:
   a battery housing;
   a plurality of cells, said cells each having a positive cell terminal and a negative cell terminal coupled to a can; and
   a spring means between said cell terminals for providing shock absorption between cells, said spring means comprising a metallic snap fit cell clip having a first portion for snapping to the can of said cell, and a second portion being a spring for covering said negative terminal, said first and second portions being electrically coupled by a metallic stem.

2. The shock absorbing battery pack of claim 1, wherein said second portion comprises a popple contact having a flat portion coupled to the negative terminal of a cell and a domed portion coupled to the postive terminal of an adjacent cell.

3. A shock absorbing battery pack, comprising:
   a battery housing:
   a plurality of cells, said cells each having a positive cell terminal and a negative cell terminal coupled to a can: and
   a spring means between said cell terminals for providing shock absorption between cells, wherein said spring means comprises a substantially L shaped metallic bracket having a first leaf spring on a horizontal member biased towards said cell can, a second leaf spring on a vertical member biased for coupling said negative terminal on said cell to a positive terminal on an adjacent cell, and a means for entrenching said bracket into said battery housing.

4. The shock absorbing battery pack of claim 3, wherein said means for entrenching comprises a protruding member for entrenching the bracket onto the housing.

5. A spring for reducing battery intercell contact intermittency, comprising:
   a cell having a negative terminal and a positive terminal, said negative terminal being coupled to a cell can; and
   a spring means coupled to said cell for biasing said negative terminal towards a positive terminal of another cell, wherein said spring means comprises a substantially L shaped metallic bracket having a first leaf spring on a horizontal member biased towards said cell can, a second leaf spring on a vertical member biased for coupling said negative terminal on said cell to a positive terminal on an adjacent cell, and a means for entrenching said bracket into said battery housing.

6. The spring of claim 5, wherein said second leaf spring comprises a popple contact having a flat portion coupled to the negative terminal of said cell and a domed portion coupled to the postive terminal of an adjacent cell.

* * * * *